Sept. 10, 1968    H. W. STEINMETZ    3,400,618
APPARATUS FOR AXIALLY CENTERING A WORKPIECE IN MACHINES ADAPTED
TO CUT A WORKPIECE TO LENGTH AND CENTER THE SAME
Filed Dec. 6, 1965                           3 Sheets-Sheet 1
Fig.1
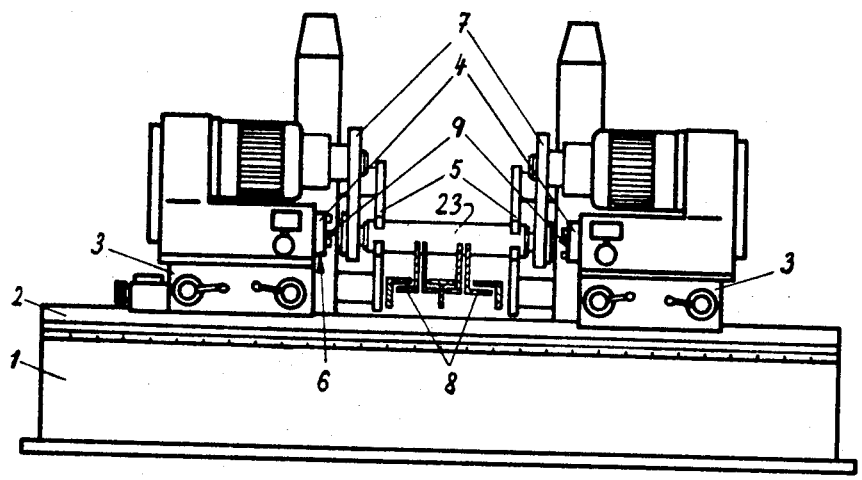
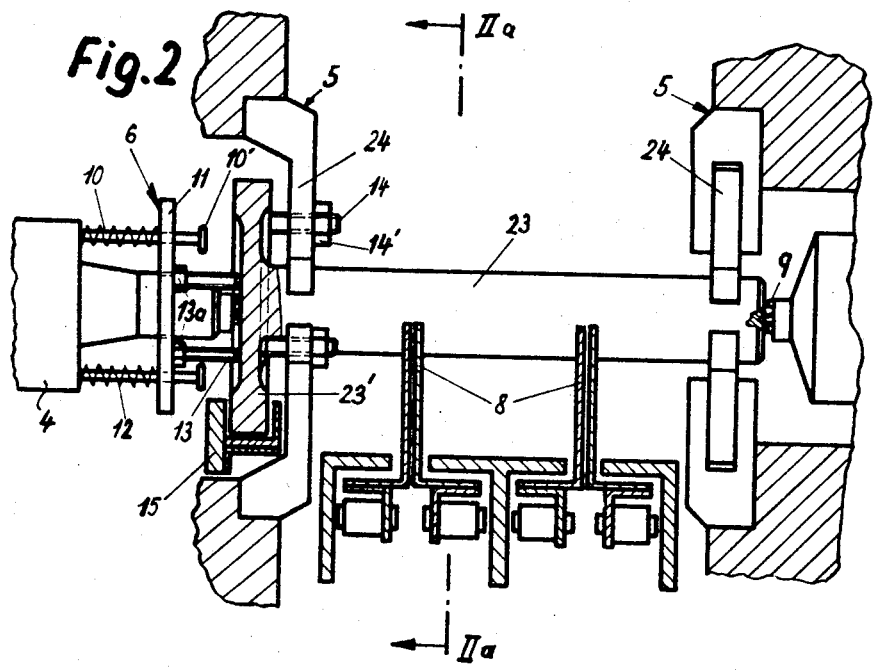

Sept. 10, 1968         H. W. STEINMETZ            3,400,618
APPARATUS FOR AXIALLY CENTERING A WORKPIECE IN MACHINES ADAPTED
       TO CUT A WORKPIECE TO LENGTH AND CENTER THE SAME
Filed Dec. 6, 1965                              3 Sheets-Sheet 3
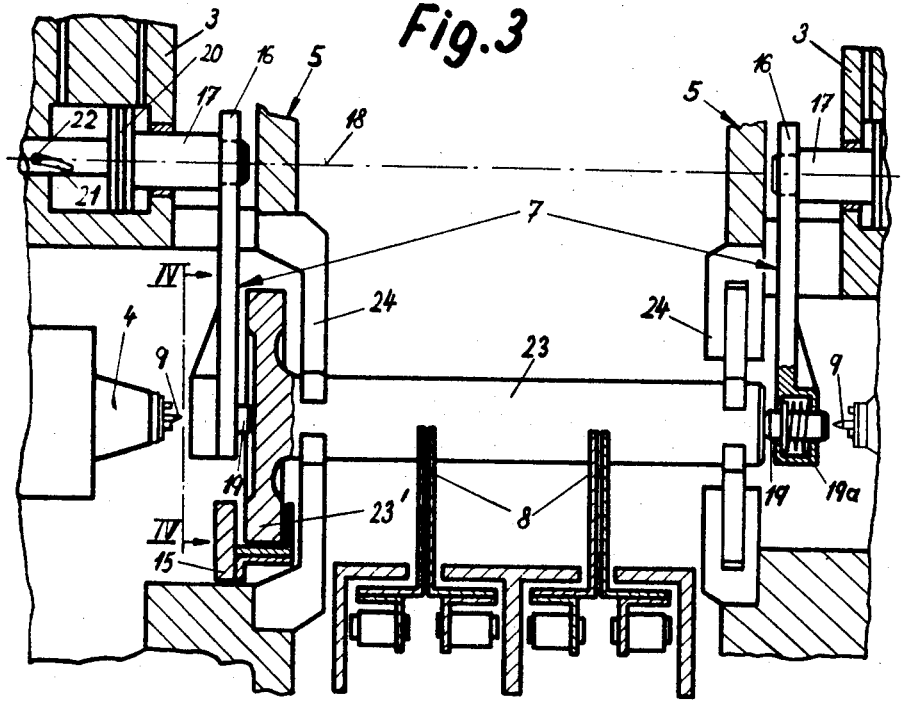
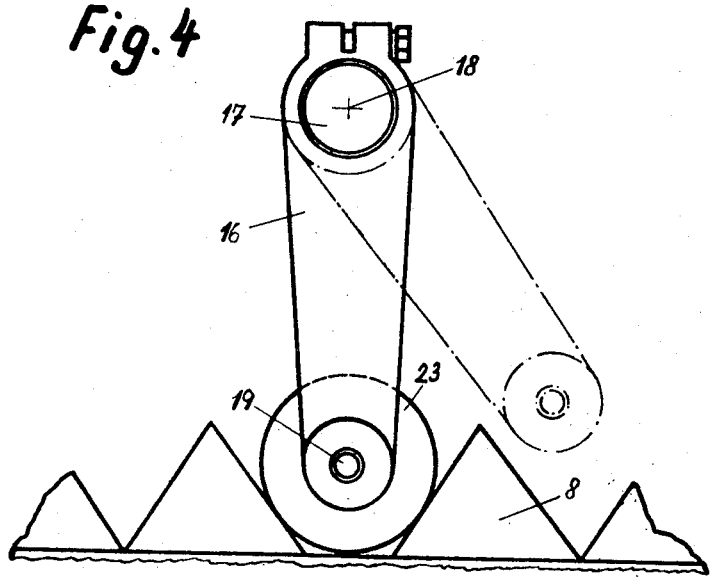

United States Patent Office 3,400,618
Patented Sept. 10, 1968

3,400,618
APPARATUS FOR AXIALLY CENTERING A WORK-PIECE IN MACHINES ADAPTED TO CUT A WORKPIECE TO LENGTH AND CENTER THE SAME
Hans Werner Steinmetz, Schaffhausen, Switzerland, assignor to Georg Fischer Aktiengesellschaft, Schaffhausen, Switzerland
Filed Dec. 6, 1965, Ser. No. 511,752
Claims priority, application Switzerland, Dec. 10, 1964, 15,943/64
9 Claims. (Cl. 82—2.5)

ABSTRACT OF THE DISCLOSURE

A device for use with a machine tool including a conveyor to convey a workpiece into machining position and abutments to engage the workpiece from opposite sides to position the workpiece in the axial direction together with clamp means to clamp the workpiece in machining position, the abutments being moveable in the axial direction of the workpiece to engage and release the workpiece.

---

The present invention relates to a positioning and clamping arrangement for a machine for cutting a workpiece to length and centering the same, in which the positioning of the workpiece so as to place the same in an axial center position is effected between two machining tools. The feeding of the workpiece in the apparatus according to the present invention may be effected for instance by means of an automatically operable conveyor belt while the working cycle of the conveyor belt is brought into synchronism with the working cycle of the positioning and clamping apparatus.

Machines for cutting a workpiece to length and centering the same are known which are equipped with clamping devices in which the workpiece is clamped coaxially with regard to the machining axis of the workpiece between two spindle sleeve units. Such a device is satisfactory as long as no automatic operation is required according to which the workpieces have to be machined in a continuous manner, namely one after another.

When with an apparatus of the above mentioned heretofore known type automatic operation is required, it has proved disadvantageous that the workpieces carried by the conveyor belt are in their axial center position not aligned with the machining tools provided in said two spindle sleeve units. Consequently, the workpieces will not always automatically be located in the desired manner between two machining tools so that disorders may result which will greatly affect the automatic operation for machining the workpieces.

It is, therefore, an object of the present invention to provide an apparatus which will overcome the above mentioned drawbacks.

It is another object of this invention to provide an apparatus of the above mentioned general type, which particularly when an automatic and successive machining of the workpieces is desired, will assure a disorder-free operation.

These and other objects and advantages of the invention will appear more clearly from the following specification in connection with the accompanying drawings, in which:

FIG. 1 diagrammatically illustrates a front view of a machine for cutting a workpiece to length and centering the same, which is provided with a positioning and clamping apparatus according to the present invention.

FIG. 2 diagrammatically illustrates a longitudinal section through another embodiment of a positioning and clamping apparatus according to the invention to be connected to the spindle sleeve or tailstock units of a machine of the above mentioned type.

Figure 2A:
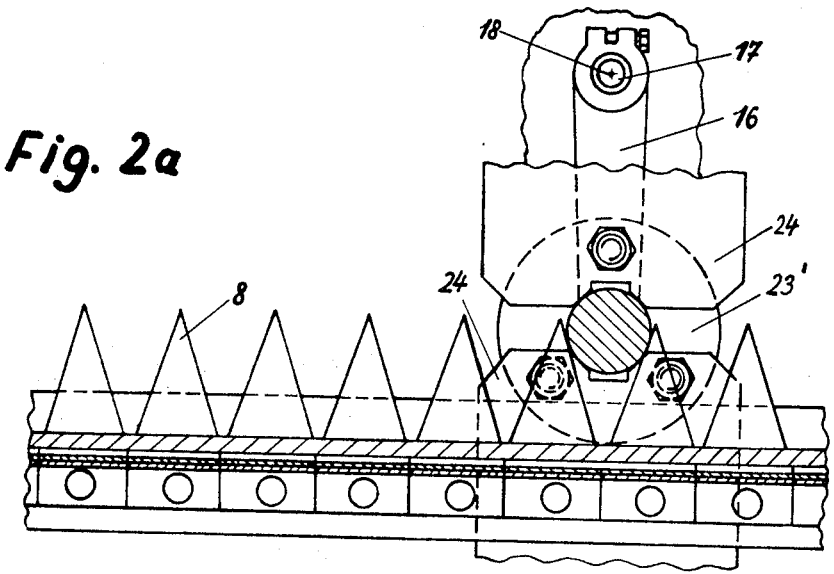
Figure 5:
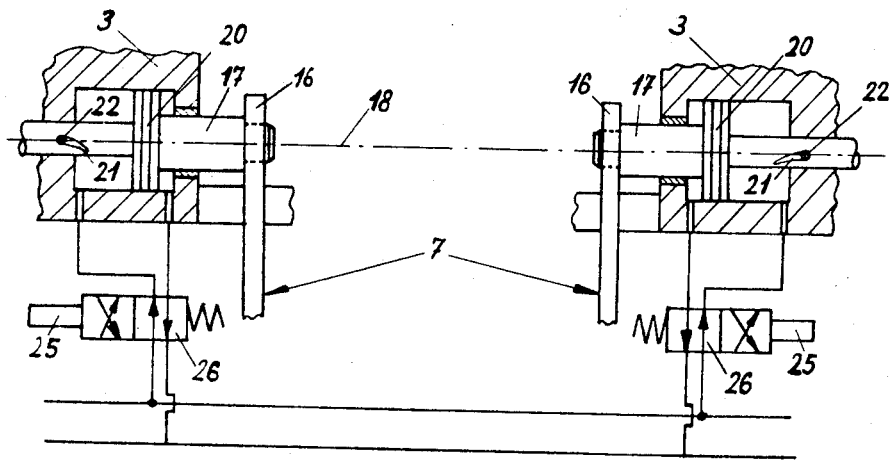

FIG. 2a is a section along the line II—II of FIG. 2.
FIG. 3 illustrates on a larger scale than FIG. 1 the positioning and clamping device as shown in the latter.
FIG. 4 is a section along the line IV—IV of FIG. 3.
FIG. 5 schematically illustrates hydraulic means, with which the two arms of a positioning device can be pivoted simultaneously to their pivoted-out or their pivoted-in position.

The apparatus for axially aligning a workpiece on a machine adapted to cut the workpiece to length and to center the same is in conformity with the present invention characterized by at least one drive which is adapted to be controlled independently of the means for controlling the machining tools and which is adapted to cause abutment or stopping bolts to engage the workpiece while moving in a direction axis parallel to the axis of rotation of the machining tools.

According to a further feature of the present invention, the drive comprises a hydraulically operable piston, and the abutment bolts are adapted to be screwed into threaded bores of a disc in a direction axis parallel to the axis of rotation of the machining tools. According to still another feature of the invention, on the upper and lower clamping jaws of the clamping device abutment bolts are in a direction axis parallel to the axis of rotation of the machining tools adapted to be screwed into threaded bores. The apparatus according to the present invention also comprises two holding bolts equipped with arms each of which is pivotable on each of the two machine carriages about a common theoretical axis of rotation by means of a piston and a pivot connected to said piston and by means of a groove inclined at the circumference of the pivot and by means of a stud engaging said groove and fixedly connected to said carriage housing, each of said arms being reciprocable along said axis of rotation.

Referring now to the drawings in detail, the machine shown in FIG. 1 comprises carriages 3 movable on guiding means 2 which extend over the entire length of the machine bed 1. The said carriages 3 are reciprocable on said guiding means 2. The two carriages 3 have connected thereto spindle sleeve units or tailstock units 4 as well as positioning devices 6 and 7. The machine of FIG. 1 furthermore comprises a conveying device 8 by means of which the workpieces 23 are conveyed to machining tools 9 on the spindle sleeve units 4. Clamping devices 5 (not shown in detail) serve for holding the workpiece during machining.

The positioning device 6 shown in FIG. 2 comprises at least three axis parallel guiding bolts 10 which are screwed into a spindle sleeve unit 4. An annular disc 11 is axis parallelly reciprocable on said guiding bolts 10 and by means of coil springs 12 is urged against abutments 10'. Abutment bolts 13 are axially screwed into disc 11 and are uniformly distributed over the circumference thereof. Abutment bolts 13 are secured to disc 11 by counter nuts 13a. By means of said counter nuts it is also possible to adjust the abutment bolts 13 in axial direction. Furthermore, abutment bolts 14 are axis parallelly with regard to the axis of rotation of the workpiece 23 screwed into clamping jaws 24 of clamping device 5 and are adapted to be arrested and adjusted to said clamping jaws by counter nuts 14'. The workpieces provided with a round flange 23' are conveyed by conveying device 8 which operates in a working cycle adapted to the working cycle of the positioning and clamping device. For purposes of supporting top-heavy workpieces 23, the transporting device is equipped with guiding rails 15 guiding the flange 23' of workpiece 23. The embodiment shown in FIG. 2 has the positioning device arranged on the left-hand carriage 3. However, if desired, the positioning device may also be arranged on the right-hand carriage 3.

The positioning device shown in FIGS. 3 and 4 comprises arms 16 pivotable on carriage 3. These arms 16 which have identical length are connected to pivot 17 and have a common theoretical axis of rotation 18. At the end of at least one arm 16 there is provided a spring-biased bolt 19 biased by spring 19a. When only one spring-biased holding bolt 19 is provided, the holding bolt 19 arranged on the opposite arm is non-movably and fixedly connected thereto.

The positioning device shown in FIGS. 1, 2, 2a, 3 and 4 operates as follows. According to the positioning device shown in the drawings, the workpieces are by means of a transporting device 8 conveyed to the clamping devices 5 and the machine tools 9. In order laterally to guide the work pieces on transporting device 8, guiding rails 15 may be provided on both sides of the transporting device 8. When the workpiece moves into the range of the clamping device 5 or the clamping jaws 24, it will first by means of the clamping device be centered and pre-clamped relative to the axis of rotation of the machining tools 9. Subsequently, the machining tools 9 connected to the spindle sleeves 4 are fed toward the workpiece while the working tools are advanced closely to the workpiece surface to be machined. During a subsequent working operation, the workpiece is by means of the positioning device 6 or by means of the abutment bolts 13 held toward the right against the machining tool 9 on the right-hand side. This is effected by means of loaded springs 12. In this way, the workpiece is positioned.

When the workpieces are provided with a round flange, the clamping jaws of clamping device 5 may be provided with abutment bolts 14 which advantageously are uniformly distributed along a circle. In such an instance the workpiece is not, as described above, moved against the right-hand machining tool 9 but against the abutment bolts 14 and is held under spring pressure. Subsequently to this operation, the workpiece is firmly clamped into the clamping device 5, is machined, and after the machining operation has been completed, the return stroke of the machining tools 9 as well as the unclamping of the clamping device 5 is initiated. The last mentioned working operation completes a working cycle for machining a workpiece. The machined work piece is removed or further advanced away from the machining tools while at the same time a new workpiece is fed to the machining tools for starting a new machining cycle.

According to the embodiment of the positioning apparatus 7 shown in FIGS. 3, 4 and 5, the workpieces are in a manner analogous to that of the embodiment of FIGS. 1 and 2 conveyed by conveying device 8 to the machining tools 9 and in immediate vicinity of said tools are aligned in their axial center position relative to said machining tools 9. As illustrated in FIG. 4, the workpiece prior to arriving within the range of the machining tools is grasped by holding bolts 19 of the pivoted-out arms 16 and is positioned during the movement of the arms 16 from their pivoted-out to their pivoted-in position.

Arms 16 are pivoted about axis 18 in downward direction in such a way (see FIG. 4) that they move toward each other whereas when tilting in upward direction they move apart. This operation is effected by a hydraulically operable piston 20 which is connected to pivot 17 and during axial movement in each of the two directions turns the pivot 17 or arm 16 connected thereto through the intervention of a groove 21 arranged at an angle at the circumference of pivot 17 and through the intervention of a stud 22 which engages the groove 21 and is fixedly connected to the housing of the carriage.

After the workpiece has been positioned, arms 16 are turned back to their pivoted-out starting position whereby on one hand the machining tools 9 for machining the workpiece may be employed and on the other hand the next following workpiece may be grasped by arms 16 or holding bolts 19.

The embodiment illustrated in FIGS. 3 and 4 has a fluid operable drive which comprises piston 20 adapted to move holding bolts 19 in an axis-parallel direction toward workpiece 23 for engagement therewith. This drive may be pneumatic, electric or mechanical.

FIG. 2a illustrates, how the workpiece 23 is positioned upon the transporting device 8 and clamped by the jaws 24 of the clamping device 5.

The solenoids 25, illustrated in FIG. 5, are arranged for controlling the actions of directional control valves 26, which are part of a hydraulic system. The simultaneous pivoting of the arms 16 of the positioning device 7 to their pivoted-out or their pivoted-in-position can be effected by the use of double acting cylinders. Thus by controlling the action of the above mentioned directional control valves 26, the pistons 20, as well as the rods of the double acting cylinders and, of course, the actuated arms 16 can simultaneously be moved in either direction.

After the workpiece has been positioned, in a manner analogous to the embodiment of FIG. 2, the workpiece is is firmly clamped in the clamping device 5, is machined and, following the machining operation, the return movement of the machining tools 9 is initiated and the clamping device 5 is opened. The thus machined workpiece is then withdrawn while at the same time the next following workpiece to be machined is subjected to a machining cycle as outlined above.

It is, of course, to be understood that the present invention is, by no means, limited to the particular arrangements shown in the drawings but also comprises any modifications within the scope of the appended claims.

What I claim is:

1. A workpiece holding device for use in connection with machine tools, especially centering machine tools, which includes: tool holding means mountable on a machine tool bed and adapted to receive and hold a machining tool and movable toward and away from a workpiece to be machined, a workpiece clamping means reciprocable transversely to the direction of movement of said tool holding means toward and way from a workpiece in machining position so as selectively to clamp or release the workpiece, workpiece positioning means movable in the direction of movement of said tool holding means to engage a workpiece in machining position and position the workpiece in the direction of movement of the tool holding means, and actuating means operable independently of said tool holding means and operatively connected to said workpiece clamping means and said workpiece positioning means for selectively actuating said clamping means and positioning means.

2. A device according to claim 1, in which said actuating means includes fluid operable cylinder piston means.

3. A device according to claim 1, in which said positioning means includes supporting means arranged adjacent to and around said tool holding means, and disc means slidably supported by said supporting means and continously urged in one direction toward the workpiece to be machined, one side of said disc means facing the workpiece to be machined, bolt means threadedly connected to said disc means and extending from said one side thereof in a direction perpendicular thereto, said clamping means having abutment means thereon projecting toward said one side of said disc means and spaced from said bolt means, said abutment means and bolt means being adapted to receive a portion of a workpiece therebetween.

4. A device according to claim 1, which includes jaw means extending along a plane substantially perpendicular and in spaced relationship to said tool holding means for supporting engagement with a workpiece to be machined, and abutment means supported by said jaw means and extending in a direction toward said tool holding means while forming a part of said workpiece clamping means.

5. A device according to claim 1, in which said workpiece positioning means includes an arm adjacent each end of a workpiece in machining position and pivotable about a common axis and provided with workpiece engaging means facing the respective ends of the workpiece for engaging a workpiece therebetween, and power operable means operatively connected to said arms and operable to move the same toward each other when said arms are being pivoted in one direction and to move said arms away from each other when said arms are being pivoted in the opposite direction.

6. A device according to claim 5, in which each of said arms has connected thereto a pivot with a fluid operable piston connected thereto, cylinder means respectively associated with said piston and reciprocably receiving the same, the circumferential surface of said pivot being provided with a spiral groove, and pin means stationarily arranged in said housing and engaging said spiral groove.

7. A device according to claim 1, which includes conveying means for conveying a workpiece to be machined toward machining position in alignment with said clamping means, and guiding means arranged at least adjacent one side of said transporting means employing a region of the workpiece for laterally guiding a workpiece to be machined toward machining position.

8. A workpiece holding device for use in connection with machine tools which includes: tool holding means mountable on a machine tool bed and adapted to receive and actuate machining tools to machine a stationary workpiece and movable toward or away from the opposite extremities of a workpiece in machining position, workpiece clamping means reciprocable transversely of the movement of said machining tools toward and away from a stationary workpiece in machining position so as selectively to clamp or release the workpiece in a fixed position, opposing workpiece positioning means relatively movable toward and away from each other in a direction perpendicular to the movement of said workpiece clamping means to engage and position the opposite extremities of a workpiece in machining position, between said tool holding means, and actuating means operatively connected to said workpiece clamping means and said workpiece positioning means for successively actuating said workpiece positioning means and said workpiece clamping means.

9. In a machine for machining workpieces, conveying means to convey workpieces successively to a machining position in which tool holding means mounted on the machine bed and adapted to receive and hold machining tools are movable toward and away from the opposite extremities of a workpiece, workpiece positioning means at said machining position movable to engage the opposite extremities of a workpiece conveyed to said machining position and to position said workpiece between said tool holding means, and workpiece clamping means movable into clamping engagement with said workpiece positioned by said positioning means to hold said workpiece stationary during a machining operation.

References Cited

UNITED STATES PATENTS

| | | | |
|---|---|---|---|
| 1,571,331 | 2/1926 | Hagman | 82—2.5 X |
| 1,945,662 | 2/1934 | Smith | 82—2.7 |
| 3,110,082 | 11/1963 | Moll | 29—2.7 |

FOREIGN PATENTS

| | | |
|---|---|---|
| 1,166,007 | 6/1958 | France. |

LEONIDAS VLACHOS, *Primary Examiner.*